Patented May 16, 1950

2,508,025

UNITED STATES PATENT OFFICE 2,508,025

COMPOSITION OF MATTER

Mortimer T. Harvey, South Orange, N. J., assignor to Harvel Research Corporation, a corporation of New Jersey No Drawing. Application January 29, 1945, Serial No. 575,193

3 Claims. (Cl. 260—45.5)

This invention relates to novel compositions of matter, to methods for preparing the same.

In one of its more specific aspects this invention is directed to novel combinations of normally solid polyvinyl butyral with (a) organic condensation reaction products of formaldehyde with furfuryl alcohol and/or (b) organic condensation products of formaldehyde with fusible acid condensation-polymerization products of furfuryl alcohol.

The furfuryl alcohol-formaldehyde condensation products are resinous and are fully described in my U. S. patent granted March 14, 1944, numbered 2,343,972. As set forth in said patent, fusible thermosetting resins may be produced by reacting furfuryl alcohol and formaldehyde in the presence of an acidic agent in such amount that the pH of the mixture of furfuryl alcohol and formaldehyde is between about 1.5 and 3.5 and preferably between about 3 and 3.5 and with the mole ratio of the quantity of furfuryl alcohol to the quantity of the formaldehyde being preferably between 1 to ½ and 1 to 3. The reaction is preferably carried out by the use of external heat and the mixture is preferably boiled under a reflux condenser until the fusible resins of the desired viscosities are produced. Then the pH of the resin may be increased above 3.5 to any desired value, even as high as 14, so that the same is stable. For a full and complete description of said resinous organic condensation products and to methods for preparing them, reference is hereby made to said patent which is hereby made part hereof.

The acid condensation-polymerization products of furfuryl alcohol-formaldehyde condensation products are resinous and are fully described in my U. S. patent granted March 14, 1944, and numbered 2,343,973. As set forth in said patent fusible thermosetting resins may be produced by reacting under acid conditions wherein the pH is not less than that obtained in a solution of 2 cc. of concentrated hydrochloric acid in 60 cc. of distilled water, formaldehyde and fusible resinous acid condensation-polymerization products of furfuryl alcohol. The preferred pH of said acidic mixture is preferably not less than 1 and the ratio of the reactants in said mixture is preferably such that for every 100 parts by weight of an acid condensation-polymerization product of furfuryl alcohol there is between about 7½ to 100 parts of formaldehyde. In practice the reaction is preferably carried out by heating the acidic mixture to boiling under a reflux condenser until there is produced a resin of the desired viscosity. Then the pH of the resin is increased above about 3.5 and to any desired value, even as high as 14 so that the same is stable. For a full and complete description of said resinous organic condensation products and to methods for preparing them, reference is hereby made to said patent which is made part hereof.

According to this invention, novel products are obtained by combining normally solid polyvinyl butyral with one or more of the fusible thermosetting resinous organic condensation products which may be made according to the teachings of said patents. These combinations may be employed alone or in combination with other materials, such as lignin, wood flour and the like. The ratio by weight of said fusible thermosetting resins to the normally solid polyvinyl butyral may vary over wide limits and may be between about 1 to 100 and 100 to 1 and is preferably between about 1 to 20 and 30 to 1. The viscosity of the resin employed may also vary over wide limits and is preferably between about 150 centipoises at 25° C. to about 100,000 centipoises at 25° C. One or more of the fusible thermosetting resins are mixed with the normally solid polyvinyl butyral, then agitated, milled and/or heated until there is a solution, a dispersion or at least a substantially uniform distribution of one in the other. Either with or without other additions, the normally solid polyvinyl butyral may be uniformly dispersed in the fusible thermosetting resins either alone or with the aid of any mutual solvent, such as ethyl alcohol or the like. When a mutual solvent is employed one of said fusible thermosetting resins may be dissolved in a quantity thereof and the normally solid polyvinyl butyral may be dissolved in another batch of said solvent. The resultant solutions may be mixed together, then agitated and the combination of said fusible thermosetting resin and normally solid polyvinyl butyral may be separated from the solvent by evaporating the solvent therefrom. The combination of normally solid polyvinyl butyral and one or more of said fusible thermosetting resins may be cured by the application of heat or by controlling the pH of the combination. When external heat is employed the pH of the combination is preferably between about 3.5 and 6. When no external heat is applied the pH of the combination is preferably any value below about 3. In either case cured products are obtained.

The cured products produced by combining said fusible thermosetting resins with normally solid polyvinyl butyral, are characterised by greater resistance to water, acids, alkalis and solvents when compared with the corresponding characteristics of normally solid polyvinyl butyral. This increase is evidenced even when the ratio by weight of said polyvinyl butyral to said resin in said product is as high as 90 parts of said butyral to 10 parts of said resin. In addition, the melting point of these products is considerably higher than the corresponding characteristic of solid polyvinyl butyral. Moreover, cured thin films of these products are tougher than correspondingly thin films of said resins even when the ratio of the polyvinyl butyral to the resin is as low as 3 to 100. Besides being tougher in cured film form, it is possible to produce cured films of said products which are more uniform than cured films of said resin and which are substantially free of pin holes when compared with thin films of said resins.

These novel compositions may be used as coating and impregnating material for various bases such as stone, metal, glass, cotton, wool, wood, paper, rayon and the like, as floor coverings, as caulking compounds as moulding compositions and the like.

For a fuller understanding of the invention, reference should be had to the following examples which are given to illustrate further the invention and are not to be construed in a limiting sense, all parts being given by weight, unless otherwise indicated.

Example 1

100 parts by weight of a fusible thermosetting resin made in accordance with the teachings of U. S. Patent 2,343,972 or 2,343,973 and having a viscosity of 1,000 cp. at 25° C., and
3 parts by weight of solid polyvinyl butyral are mixed and heated together at approximately 100° C. until there is a uniform distribution of one in the other. Then said mass is thinned with 100 parts by weight of ethyl alcohol.

This thinned product may be spread on a base such as metal, paper, cloth, wood or the like to coat and/or impregnate the same and the coated and/or impregnated base may be placed in an oven at about 280° F. for 15–30 minutes to evaporate the solvent and cure said coating and/or impregnant to provide a base carrying a tough, uniform film substantially free of pin holes and having good alkali, acid and solvent resistance.

Example 2

A mixture of 100 parts by weight of solid polyvinyl butyral and 10–25 parts of a fusible thermosetting resin made in accordance with the teachings of U. S. Patent 2,343,972 or 2,343,973 and having a viscosity of about 15,000 centipoises at 25° C. is milled on a rubber mill whose rolls are maintained at a temperature of between about 200° F.–250° F. Milling is continued for about 15 minutes so as to obtain a fairly uniform distribution of one into the other and obtain a sheeted stock which may be removed and calendered to any desired thickness. Then it is placed in an open oven at 200° F.–250° F. and heated for 1 to 5 hours to obtain a solid product whose melting point, water resistance, acid, alkali and solvent resistance characteristics are far superior to those of polyvinyl butyral.

Example 3

100 parts by weight of a fusible thermosetting resin made in accordance with the teachings of U. S. Patent 2,343,972 or 2,343,973 and having a viscosity of about 1,000 centipoises at 25° C. and three parts of solid polyvinyl butyral are mixed and heated together at approximately 100° C. until there is a uniform distribution of one in the other. Then said mass is added slowly on to the heated rolls (200° F.–250° F.) of a rubber mill and there is simultaneously added thereto in the same manner a mixture of 150 parts of fine wood flour and 1 part of boric acid. While a wide variety of wood flours may be employed, I prefer to employ those having a lignin content greater than 5%. Milling is continued until a uniform and intimate admixture of the components is formed after which this millable composition is sheeted, cut, preformed and cured in open ovens or in open and closed molds, or it may be extruded or treated in any other suitable manner and then cured at temperatures between about 200° F. to 250° F. until a substantially infusible product is obtained.

While this invention has been described in some detail, it is not to be limited thereby because the same is capable of modifications and changes without departing from the spirit thereof.

Having thus described my invention, what I claim and desire to protect by Letters Patent is:

1. A novel product comprising normally solid polyvinyl butyral and a fusible thermosetting resin in intimate relationship and substantially uniformly distributed with respect to each other, said resin selected from the group consisting of resinous acid condensation reaction products of furfuryl alcohol and formaldehyde and resinous acid condensation reaction products of formaldehyde and fusible acid condensation-polymerization products of furfuryl alcohol.

2. A novel product comprising a cured combination of normally solid polyvinyl butyral and a fusible thermosetting resin in intimate relationship and substantially uniformly distributed with respect to each other, said resin selected from the group consisting of resinous acid condensation reaction products of furfuryl alcohol and formaldehyde and resinous acid condensation reaction products of formaldehyde and fusible acid condensation-polymerization products of furfuryl alcohol.

3. A novel product comprising a solution of normally solid polyvinyl butyral and a fusible thermosetting resin in a mutual solvent, said resin selected from the group consisting of resinous acid condensation reaction products of furfuryl alcohol and formaldehyde and resinous acid condensation reaction products of formaldehyde and fusible acid condensation-polymerization products of furfuryl alcohol.

MORTIMER T. HARVEY.

REFERENCES CITED

The following references are of record in the file of this patent:

UNITED STATES PATENTS

| Number | Name | Date |
| --- | --- | --- |
| 2,306,924 | Zerweck | Dec. 29, 1942 |
| 2,343,972 | Harvey | Mar. 14, 1944 |
| 2,343,973 | Harvey | Mar. 14, 1944 |
| 2,345,966 | Fiedler | Apr. 4, 1944 |
| 2,366,049 | Payne | Dec. 26, 1944 |
| 2,399,055 | Nordlander | Apr. 23, 1946 |